United States Patent [19]
Matsui et al.

[11] 4,368,975
[45] Jan. 18, 1983

[54] PROJECTION DEVICE

[75] Inventors: Yoshiya Matsui, Yokohama; Setsuo Minami, Kawasaki; Noritaka Mochizuki, Yokohama; Isao Harumoto, Yokosuka; Atsuo Tsunoda, Fuchu; Shiro Hirai, Tama; Masami Ohkubo, Fujisawa, all of Japan

[73] Assignee: Canon Kabushiki Kaisha, Tokyo, Japan

[21] Appl. No.: 240,835

[22] Filed: Mar. 5, 1981

[30] Foreign Application Priority Data

Mar. 14, 1980 [JP] Japan .................................. 55/32525

[51] Int. Cl.³ ....................... G03B 27/48; G03B 27/50
[52] U.S. Cl. ........................................... 355/50; 355/8; 355/46
[58] Field of Search ................ 355/1, 50, 51, 46, 8, 355/11

[56] References Cited
U.S. PATENT DOCUMENTS 4,173,411 11/1979 Massengeil ............................ 355/50
4,215,933 8/1980 Feneberg et al. ..................... 355/50

Primary Examiner—Richard A. Wintercorn
Attorney, Agent, or Firm—Fitzpatrick, Cella, Harper & Scinto

[57] ABSTRACT

This specification discloses a projection device in which a plurality of element lens systems for projecting a part area of an object onto a predetermined part area on the image plane at erect one-to-one magnification are arranged parallel to one another in a plane perpendicular to the optical axis. Each element lens system is a telecentric system comprising three thin lenses of the same shape arranged in the direction of the optical axis, and an intermediate lens is provided at a position deviated from the intermediate point between the object side lens and the image plane side lens. A light absorbing member for extinguishing any light rays exceeding the effective lens diameter is provided between the lenses, and the light intensity distribution on the image plane of each element lens system is controlled substantially to Gauss distribution form by aperture eclipse and, even if there is any error in the arrangement interval, the exposure amount distribution in the arrangement direction superposed on the image plane is uniform.

7 Claims, 8 Drawing Figures

PROJECTION DEVICE

BACKGROUND OF THE INVENTION

1. Field of the Invention

This invention relates to a projection device of an erect one-to-one magnification system of short conjugate for use in a copying apparatus or the like.

2. Description of the Prior Art

It is known that the conjugate from the object plane to the image plane may be reduced by a so-called ommeteal optical system in which a plurality of element lens systems for projecting a part area of an object onto a predetermined part area on the image plane are arranged in a plane perpendicular to the optical axis in a predetermined direction, namely, lengthwise of the slit in a slit exposure type copying apparatus, thereby making the entire body the copying apparatus compact. Element lens systems each comprising three lenses arranged in the direction of the optical axis are known from U.S. Pat. Nos. 3,592,542 and 3,584,952. The middle one of the three lenses arranged in the direction of the optical axis acts as a field lens and, by the imaging actions of the two lenses on the opposite sides of the field lens, a part area of an object is projected onto a predetermined part area on the image plane and as a whole, the slit area of the object is projected onto the corresponding slit area on the image plane at erect one-to-one magnification. Briefly describing the imaging actions, the object point is imaged as an inverted intermediate image just at the center of the length of the optical axis of the element lens system by the lens nearest the object side (referred to as the first lens) and thereafter, is re-imaged on the image plane by the lens nearest the image plane side (referred to as the third lens), and finally, an erect one-to-one magnification image is formed. That is, generally, such optical system is a symmetrical optical system. The first lens and the third lens suffice for the imaging system, but to prevent any loss of the quantity of light, namely, to suppress the aperture eclipse, a second lens having a field action is disposed near the intermediate image. On the intermediate image plane, a mask is provided to limit the view field in each element lens system, and an area corresponding to the mask view field is imaged on the final image plane and this is superposed lengthwise of the slit so that when scanning is effected, the exposure amount distribution integrated in the scanning direction is uniform lengthwise of the slit.

However, in such apparatus, it is necessary to accurately set the shape and size of the mask, the arrangement pitch in the lengthwise direction of the slit and the relative position of the mask to the lenses in the element lens systems, in conjunction with the arrangement of the lenses of each element lens system in the lengthwise direction of the slit, and in fact, this is considerably difficult.

By the workmanship of this mask and the relative relation between the mask and the lenses during the setting, the irregularity of exposure amount in the lengthwise direction of the slit is determined and thus, the optical performance for the entire apparatus depends greatly on the mask.

Therefore, if the conventional mask can be omitted and yet the function as previously described can be provided, it will be very desirable from the viewpoint of manufacture.

Incidentally, U.S. Pat. No. 4,215,933 shows that an element lens system comprises three lenses and that a third lens is provided at a position deviated from the intermediate point between the lens near the object and the lens near the image plane, but in this patent, a mask is provided intermediate of each element lens system so that the light intensity distribution on the image plane has an oblique boundary of about 80° with respect to the arrangement direction with the light intensity distribution of the adjacent element lens system, and this suffers from the problem as previously noted.

SUMMARY OF THE INVENTION

The present invention has for its object to provide a novel projection device in which each element lens system comprises three lenses and the conventional mask is omitted and a light intensity distribution in Gauss distribution form is formed on the image plane.

Such object is achieved by such a construction that in an element lens system comprising three lenses arranged in the direction of the optical axis, an intermediate lens is provided at a position deviated from the intermediate point between the lens near the object and the lens near the image plane, a light absorbing member for extinguishing any light rays exceeding the effective lens diameter is provided between the lenses, the light intensity distribution on the image plane of each element lens system is rendered substantially into Gauss distribution form by aperture eclipse and the element lens systems are arranged in a plane perpendicular to the optical axis at a predetermined interval in a predetermined direction.

The invention will become more fully apparent from the following detailed description thereof taken in conjunction with the accompanying drawings.

DESCRIPTION OF THE PREFERRED EMBODIMENTS

Figure 1:
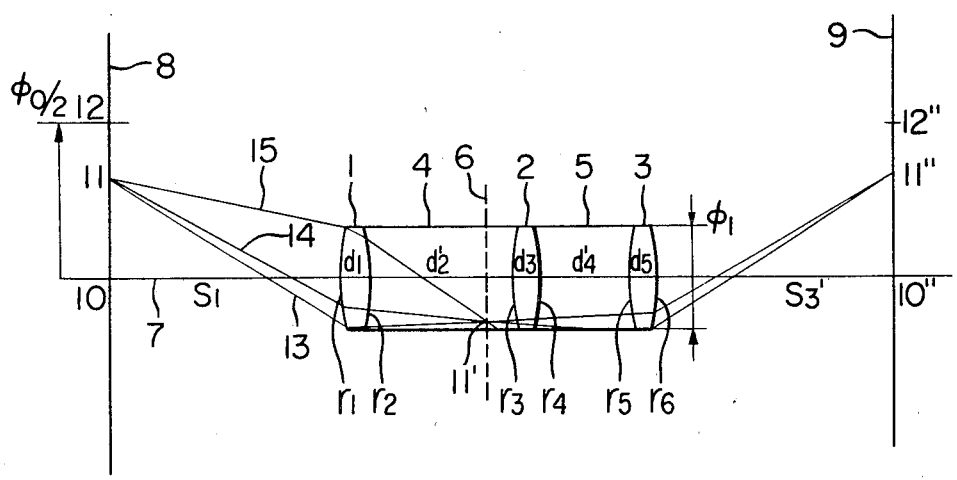
FIG. 1 is an illustration in the direction of the optical axis of an element lens system in the present invention.

Referring to FIG. 1, lenses 1 and 3 are conventional imaging lenses. The light beam from the object point 11 on an object plane 8 which is off the optical axis is converged to the intermediate image point 11' on an intermediate imaging plane 6 by the lens 1, whereafter it becomes a divergent light beam and travels toward a lens 2. At that time, the light beam within a range indicated by 13 and 14 passes through the lenses 2 and 3 and travels toward an image plane 9 and is converged to the final image point 11''. The final image point 11'' is conjugate with the object point 11 and is an erect one-toone magnification image. The central ray of the light beam within the range indicated by 13 and 14 becomes parallel to the optical axis and crosses the intermediate image plane because the system of lenses 1, 2 and 3 is a so-called telecentric system if the effective diameters of these lenses are equal. The role of the lens 2 will here be described. The lens 2 has such a role that instead of rendering the quantity-of-light transmission factor within a required view field to 100% as in the conventional field lens, the action thereof is weakened so that the quantity-of-light transmission efficiency within the required view field is 100% at the center of the view field but is suitably reduced from the center of the view field toward the outside thereof and becomes zero in the maximum view field portion. As it were, the lens 2 is a field lens and also acts as an imaging lens in a sense.

Next, the light beam within a range indicated by 14 and 15, when it diverges from 11', impinges on a light absorbing member 4 and further on a light absorbing member 5 and is absorbed thereby and thus, is not converged to the image point 11''. That is, the light absorbing members 4 and 5 cause light rays exceeding the effective diameter of the lens to disappear. Thus, of the light beam which enters the first lens 1 from the object point 11, the light beam which contributes to the imaging at the image point 11'' is within a solid angle in a range indicated by 13 and 14. The magnitude of this solid angle becomes smaller from the on-axis portion toward the off-axis portion due to aperture eclipse, and becomes zero in the maximum view field portion 12. This solid angle is greatest at the object point 10 on the optical axis 7, and the magnitude thereof is such that the pupil of the lens 1 fills against the object point 10, and the kick by the light absorbing members 4 and 5 is zero.

Figure 2:
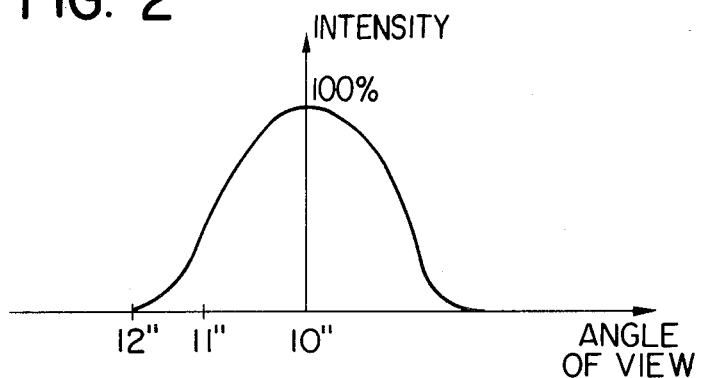
FIG. 2 shows the light intensity distribution on the image plane of the element lens system.
Figure 3:
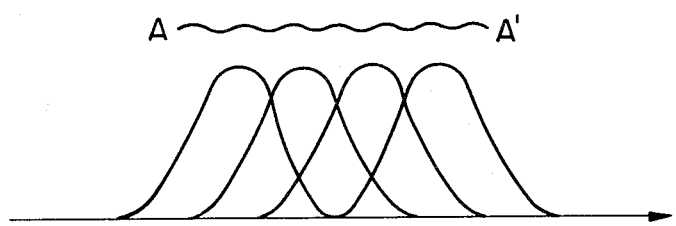
FIG. 3 shows the light intensity distributions superposed one upon another in the arrangement direction of the element lens system.

FIG. 2 is a graph which shows the light intensity distribution (proportional to the aforementioned solid angle) on the image plane 9 of the element lens system and in which the ordinate represents the light intensity and the abscissa represents the image height. This light intensity distribution is substantially in the form of a Gauss distribution. This is an effect which does not occur in a symmetrical optical system using similarly configured lenses, and such effect is achieved by providing an asymmetrical optical system. If such element lens systems are arranged in an array form at a predetermined interval in a plane perpendicular to the optical axis, the final light intensity distribution on the image plane will become one in which the light intensity distributions of the element lens systems are superposed one upon another as shown in FIG. 3. If this is integrated in the scanning direction, the exposure amount distribution will be substantially uniform in the arrangement direction as indicated by AA'.

The numerical data of the optical system of the present invention will now be described.

Let $\psi_1$, $\psi_2$ and $\psi_3$ be the refractive powers of the lenses 1, 2 and 3, respectively, $\phi_1$, $\phi_2$ and $\phi_3$ be the effective diameters of the lenses 1, 2 and 3, respectively, $e_1'$ be the principal point interval between the lenses 1 and 2, $e_2'$ be the principal point interval between the lenses 2 and 3, $S_1$ be the distance between the lens 1 and the object plane, $\phi_0$ be the maximum diameter of the effective object view field, $S_3'$ be the distance between the lens 3 and the image plane, and Fe be the object side F-number, and consider the optical system as a thin system.

Fe, $S_1$ and $\phi_0$ can be preset and from these set amounts and the paraxial imaging theory, the necessary numerical data of the optical system are determined. First, from the definition of F-number, $$Fe = \frac{\sqrt{S_1^2 + \left(\frac{\phi_1}{2}\right)^2}}{\phi_1} \tag{1}$$

From the paraxial imaging theory in the erect one-to-one magnification system, $$\psi_1 h_1 + [h_1 - (\alpha_1 + \psi_1 h_1)e_1'] \times (\psi_2 + \psi_2) - \tag{2}$$

$$\{(\alpha_1 + \psi_1 h_1) + \psi_2 \times [h_1 - (\alpha_1 + \psi_1 h_1) \times e_1']\} \times \psi_3 e_2' = 0$$

$\alpha_1$ is the converted inclination angle on the object side and $$\alpha_1 \equiv \frac{h_1}{S_1}.$$

$h_1$ represents the incidence height of the light ray into the lens 1 during the calculation of the paraxial amount.

Assuming that the refractive powers of the lenses 1, 2 and 3 are all equal with the machinability thereof taken into account, equation (2) may be simplified as follows:

$$3\psi h_1 - 2\psi e_1' \times (\alpha_1 + \psi h_1) - \tag{3}$$

$$[\alpha_1 + 2\psi h_1 - \psi \times (\alpha_1 + \psi h_1) \times e_1'] \times \psi e_2' = 0$$

Also, from the intermediate imaging magnification $M_1$, $$M_1 = \frac{\alpha_1}{\alpha_1'} = -\frac{\phi_1}{\phi_0} \tag{4}$$

$\alpha_1'$ is the image side converted inclination angle regarding the lens 1 and $$\alpha_1' \equiv \frac{h_1}{S_1'}.$$

Also, from the fact that the intermediate imaging plane lies between the lenses 1 and 2, $$S_1' < e_1' \tag{5}$$

$S_1'$ is the distance from the lens 1 to the intermediate imaging plane. From formulas (1) to (5), the numerical data of the optical system are set as follows:

$$\phi_1 = \frac{-S_1/Fe}{\sqrt{1 - \left(\frac{1}{2Fe}\right)^2}} \tag{6}$$

$$e'_1 > S'_1 = \frac{-\phi_1}{\phi_0} \times S_1 \qquad (7)$$

$$e'_2 = \frac{3 - 2e'_1 \times \left(\frac{1}{S_1} + \psi\right)}{\frac{1}{S_1} + 2\psi - \psi\left(\frac{1}{S_1} + \psi\right) \times e'_1} \qquad (8)$$

$$\frac{1}{S'_3} = \frac{1}{1 - \left(\frac{1}{S_1} + \psi\right) \times e'_1 - \left[\frac{1}{S_1} + 2\psi - \psi \times \left(\frac{1}{S_1} + \psi\right) \times e'_1\right] \times e'_2} \times \qquad (9)$$

$$\left[\frac{1}{S_1} + 2\psi - \psi \times \left(\frac{1}{S_1} + \psi\right) \times e'_1 + \psi \times \left\{1 - \left(\frac{1}{S_1} + \psi\right) \times e'_1 - \right.\right.$$

$$\left.\left. e'_2 \times \left[\frac{1}{S_1} + 2\psi - \psi \times \left(\frac{1}{S_1} + \psi\right) \times e'_1\right]\right\}\right]$$

The refractive power $\psi$ of the lens may be calculated by suitably giving $e_2'$ in equation (8), or vice versa.

By suitably selecting the values of $e_1'$ and $e_2'$ indicated in equations (7) and (8), the quantity-of-light transmission efficiency within the required view field by the lens 2 can be suitably varied. In an embodiment, $e_1' > 1.02e_2'$ is selected from the viewpoint of designing. When the reversibility of light is taken into account, $e_1' < 0.98e_2'$ will also do.

In the foregoing description, the optical has been discussed as a thin system, but in the actual optical system, a suitable thickness is adopted and therefore, even in the case of a great thickness, $e_1'$, $e_2'$, etc. are intactly used as the amounts measured with the principal point between the lenses as the reference.

Next, with the refractive index n and the lens thickness d as known amounts, the curvature radii $r_1$ and $r_2$ of the lens statisfy the following equation from the definition of refractive power:

$$\psi = (n - 1) \times \left(\frac{1}{r_1} - \frac{1}{r_2}\right) + \frac{d}{r_1 \times r_2} \times \frac{(n - 1)^2}{n} \qquad (10)$$

Assuming that the lens is a biconvex lens of the same curvature with the machinability thereof taken into account, the following equation is given:

$$\psi = (n - 1) \times \frac{2}{r} - \frac{d}{r_2} \times \frac{(n - 1)^2}{n} \qquad (11)$$

The lens data in the embodiments of the present invention will now be shown. P is the arrangement interval, $d_2'$ is the distance between the second surface of the lens 1 and the first surface of the lens 2, and $d_4'$ is the distance between the second surface of the lens 2 and the first surface of the lens 3. d is the common thickness of the lenses 1, 2 and 3, $r_1$, $r_3$ and $r_5$ are the curvature radii of the object side surfaces of the lenses 1, 2 and 3, respectively, $r_2$, $r_4$ and $r_6$ are the curvature radii of the image side surfaces of the lenses 1, 2 and 3, respectively, and l is the distance from the object plane to the intermediate image plane.

|  | Embodiment 1 | Embodiment 2 |
|---|---|---|
| $\phi_0$ | 6.8 | 6.9 |
| $\phi_1$ | 1.8 | 1.8 |
| $S_1$ | −27.0 | −27.5 |
| nd | 1.491 | 1.51633 |
| Material | Acryl | BK7 |
| $r_1, r_3, r_5$ | 5.8 | 6.1 |
| $r_2, r_4, r_6$ | −5.8 | −6.1 |
| d | 2.3 | 2.2 |
| $d'_2$ | 8.3 | 8.0 |
| $d'_4$ | 4.7 | 4.7 |
| P | $0.36\phi_0 < P < 0.44\phi_0$ | $0.36\phi_0 < P < 0.44\phi_0$ |
| $S'_3$ | 21 | 22 |
| l | 36.65 | 37.02 |

Figure 4A:
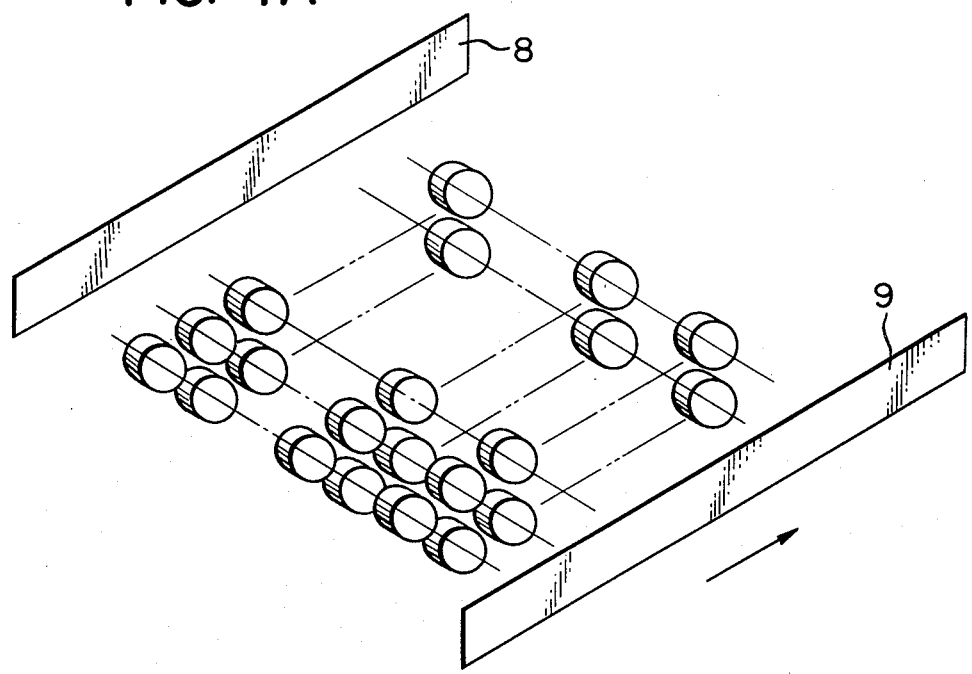
FIG. 4A is a perspective view of the arrangement of the element lens system.
Figure 4B:
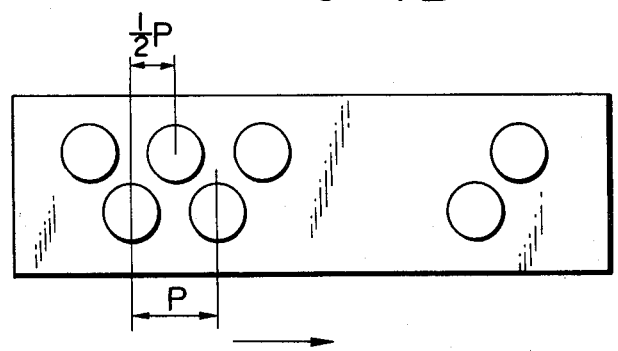
FIG. 4B is an illustration of the arrangement of the element lens system as viewed in the direction of the optical system.

FIGS. 4A and 4B show the lens arrangement. FIG. 4A is a perspective view of the arrangement of element lens systems, and FIG. 4B is a view of the arrangement of element lens systems as viewed in the direction of the optical axis. The element lens systems have their end surfaces in the direction of the optical axis made uniform and are disposed in two rows lengthwisely of the slit in a plane perpendicular to the optical axis and in a so-called staggered arrangement in which the element lens systems are deviated from one another by a half pitch ½ P, whereby the irregularity of exposure amount may be maintained at several percent or less. Of course, even a single row could provide a predetermined optical performance.

Figure 5A:
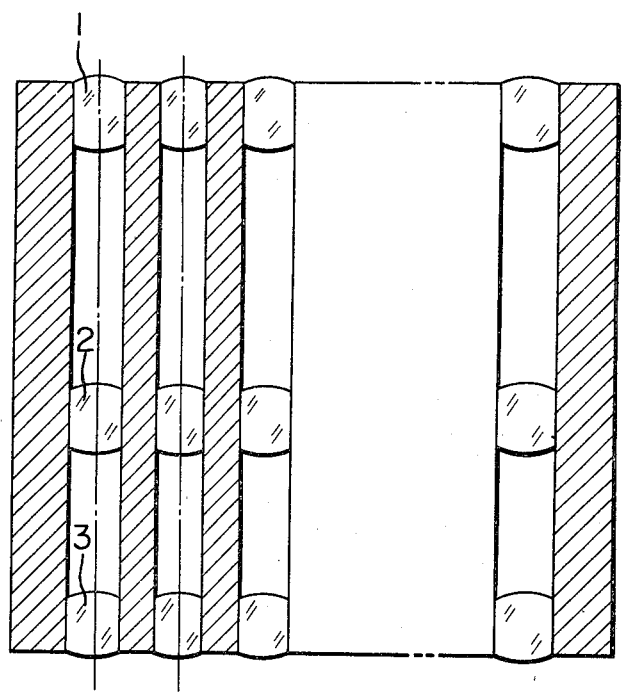
FIGS. 5A and 5B are cross-sectional views of the element lens system taken in the arrangement direction thereof.
Figure 5B:
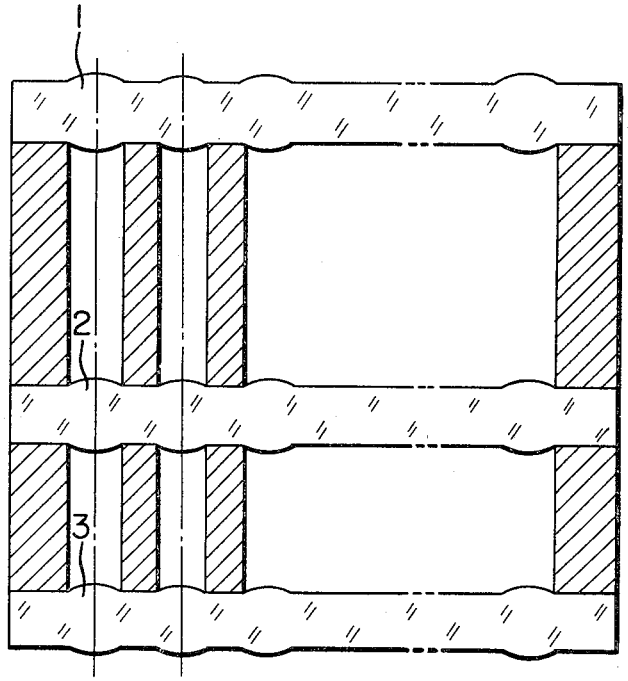

FIGS. 5A and 5B show cross-sections of the element lens systems taken in the arrangement direction. The lenses of the element lens systems may be either separate from one another in the arrangement direction as shown in FIG. 5A or in the form of so-called lenticular sheet in which they are continuous in the arrangement direction as shown in FIG. 5B.

To avoid the influence of an error such as eccentricity or the like which would result from the difference in thermal expansion which in turn would result from the difference between the material of the lenses and the material of the lens holding members, the lenticular sheet may be divided so that a plurality of lenticular areas each including a plurality of lens elements are provided with minute gaps therebetween. The expansion and contraction of the members by temperature is absorbed by such minute gaps.

The holding member (the portion indicated by hatching) of each of the above-described element lens systems provides a light absorbing member which controls light so that the light may pass only through an effective diameter area.

Figure 6:
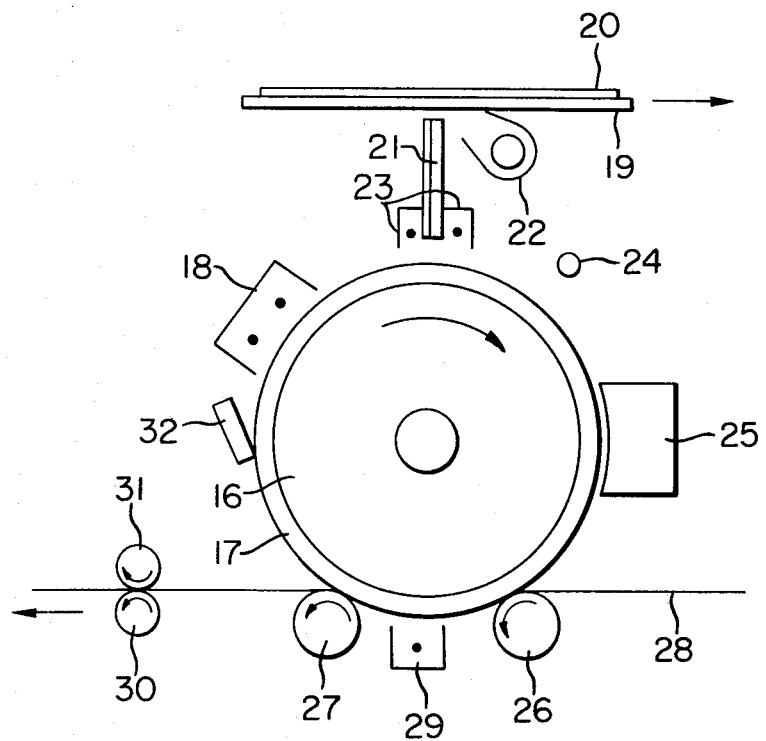
FIG. 6 is a view showing the whole of a copying apparatus to which the present invention is applied.

In FIG. 5B, by suitably selecting the thickness of the lenses, the arrangement interval and the angle of view of the lenses, any unnecessary light rays which will enter from each lens into adjacent element lens system beyond the effective diameter of each lens are eliminated. FIG. 6 shows the entire process of a copying apparatus to which the present invention is applied. In FIG. 6, reference numeral 16 designates a drum which is rotatively driven at a constant velocity in the direction of arrow by a motor, not shown, and which has on the periphery thereof a photosensitive medium 17 comprising an electrically conductive substrate, a photoconductive layer and a transparent surface insulating layer successively layered in the named order. The surface of this photosensitive medium 17 is first subjected to uniform charging by a corona discharger 18, the polarity of the charging being positive when the photoconductive layer is an N-type semiconductor and being negative when the photoconductive layer is a P-type semiconductor. Subsequently, the photosensitive medium 17 is exposed to the image light from an original 20 placed on a transparent original carriage which is moved in the direction of arrow in synchronism with the rotation of the drum 16 and at a velocity equal to the peripheral velocity of the drum 16 multiplied by the inverse number of the imaging magnification (in the case of the one-to-one magnification) image formation, at the same velocity as the drum), and the image of the original is formed on the photosensitive medium 17 by a projection lens array 21. The area of the original 20 to which the array 21 is opposed, namely, the area of the original which is to be imaged on the photosensitive medium 17, is illuminated by an illuminating system 22 comprising a lamp and a reflector. If, for example, the quantity of illuminating light is adjusted, the amount of exposure for the photosensitive medium 17 can be adjusted.

The photosensitive medium 17 is subjected to the discharging by a corona discharger 23 opposite in polarity to the AC corona discharger 18 simultaneously with being subjected to the image exposure by the array 21, whereby a charge pattern corresponding to the image of the original 20 is formed on the photosensitive medium 17, and the whole surface of the photosensitive medium 17 is further subjected to uniform exposure by a lamp 24, whereby an electrostatic latent image of good contrast is formed on the photosensitive medium. The latent image thus formed is developed into a visible toner image by a developing device 25 which may be of the cascade type or the magnet brush type. Subsequently, this toner image is transferred to transfer paper 28 fed from supply means, not shown, and brought into contact with the photosensitive medium 17 by rollers 26 and 27 and transported at the same velocity as the photosensitive medium 17. To enhance the image transfer efficiency, a charge opposite in polarity to the toner is imparted to the back side of the transfer paper 28 at the image transfer station and this is accomplished by a corona discharger 29. The toner image thus transferred to the transfer paper 28 is fixed by a suitable fixing device such as a heating-fixing device provided with a pair of rollers 30, 31 urged against the transfer paper, whereafter the transfer paper is conveyed into a tray, not shown.

After the image transfer, the surface of the photosensitive medium is cleaned by the edge of an elastic blade 32 urged thereagainst to wipe off any residual toner, thus becoming ready for another cycle of image processing. The discharger 23 is installed so as to discharge the surface of the photosensitive medium 17 simultaneously with the image exposure, but alternatively it may be disposed between the charger 18 and the imaging system so as to discharge the surface of the photosensitive medium 17 before the image exposure. In such case, the lamp 24 would be unnecessary. Also, the photosensitive medium 17 may be one having no surface insulating layer. In this case, the discharger 23 and the lamp 24 would be unnecessary.

It is apparent that, when the reversibility of light is taken into consideration, as previously described, the present invention is also established by a system in which the object plane and the image plane in FIG. 1 have been reversed, namely, a system in which the interval between the lens near the object side and the intermediate lens is smaller than the interval between the intermediate lens and the lens near the image plane and the intermediate image plane lies between the intermediate lens and the lens near the image plane, and the invention is not restricted to the shown embodiment. Thus, according to the present invention, there can be provided a compact projection device which comprises a novel asymmetrical ommateal optical system in which an element lens system comprises three lenses and the conventional mask is omitted.

What we claim is:

1. A projection device comprising:
   a plurality of element lens systems each including three lenses arranged in the direction of the optical axis for projecting a portion of the object plane onto a predetermined portion on the image plane at the erect one-to-one magnification through an intermediate image, said element lens systems being arranged in a plane perpendicular to the optical axis with a predetermined interval therebetween in a predetermined direction, the intermediate lens lying between the object side lens and the image plane side lens of each of said element lens systems being deviated from the position of the intermediate image in the direction of the optical axis; and
   a light absorbing member, provided between said lens systems, for attenuating and extinguishing any light rays beyond the effective lens diameter area to define aperture eclipse to provide Gaussian light intensity distributions on the image plane of said element lens systems, which distributions are superposed one upon another so that the exposure distribution in the predetermined direction is uniform on the image plane.

2. A projection device according to claim 1, wherein said element lens systems are arranged in two parallel rows in a plane perpendicular to the optical axis and with one-half pitch deviation therebetween.

3. A projection device according to claim 2, wherein said light absorbing member serves also as a holding member for surrounding and holding the outer peripheral portion of each of the lenses of said element lens systems, and the lens surfaces in the arrangement direction are separate from one another.

4. A projection device according to claim 2, wherein the lenses of said element lens systems are integrally provided in the form of a lenticular sheet in the arrangement direction in the plane perpendicular to the optical axis.

5. A projection device according to claim 4, wherein each of the lenses of said element lens systems is provided as an aggregation of a plurality of divided lenticular areas in the arrangement direction in the plane perpendicular to the optical axis, and a minute gap is provided between the adjacent lenticular areas.

6. A projection device according to claim 2, wherein $$e_1' > 1.02 e_2'$$

where $e_1'$ is the principal point interval between the object side lens in the light path and the intermediate lens, and $e_2'$ is the principal point interval between the intermediate lens and the image plane side lens.

7. A projection device according to claim 2, wherein $$e_1' < 0.98 e_2'$$

where $e_1'$ is the principal point interval between the object side lens in the light path and the intermediate lens, and $e_2'$ is the principal point interval between the intermediate lens and the image plane side lens.

* * * * *